April 9, 1968

L. MORETTO 3,376,741

ELECTRO-OPTICAL DEVICE FOR RECORDING
VARIABLE PHYSICAL QUANTITIES

Filed Aug. 17, 1966

INVENTOR.
Luciano Moretto
BY
ATTORNEY

April 9, 1968
L. MORETTO
3,376,741
ELECTRO-OPTICAL DEVICE FOR RECORDING
VARIABLE PHYSICAL QUANTITIES
Filed Aug. 17, 1966
3 Sheets-Sheet 3
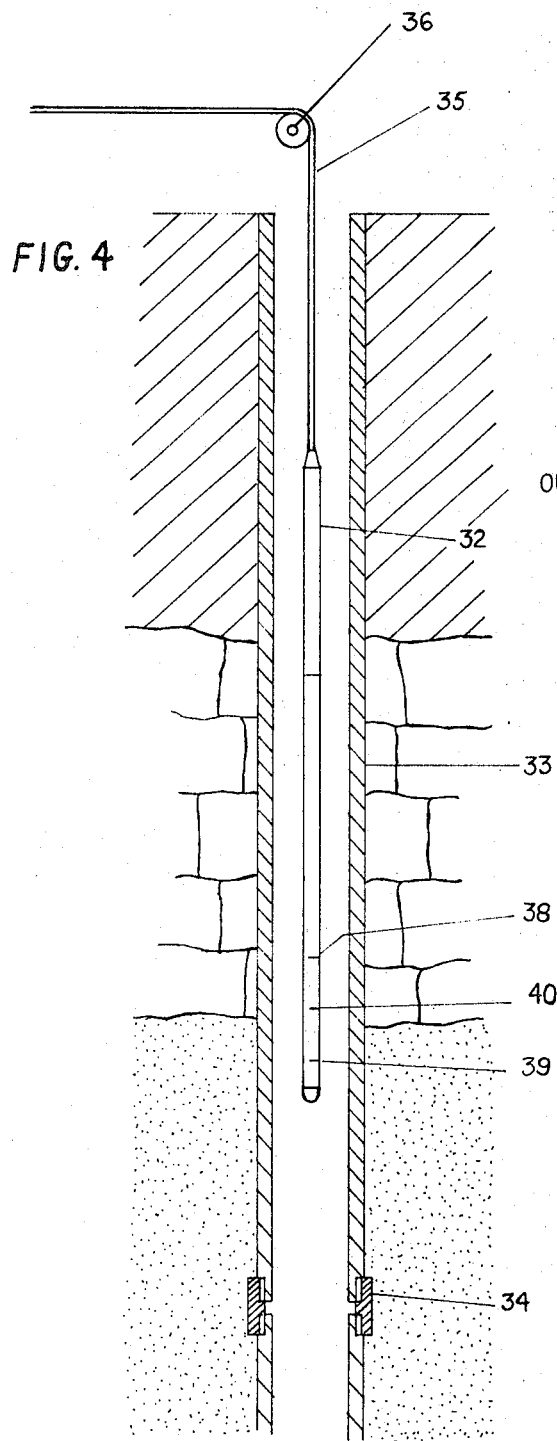
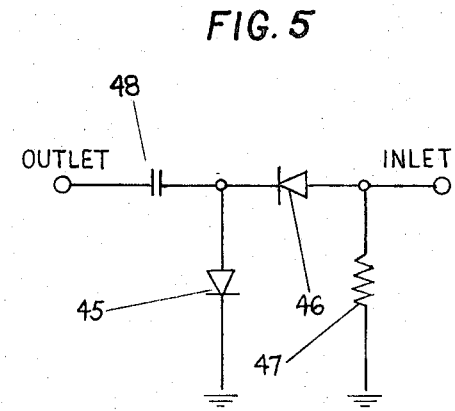
INVENTOR.
Luciano Moretto
BY
ATTORNEY

United States Patent Office 3,376,741
Patented Apr. 9, 1968

3,376,741
ELECTRO-OPTICAL DEVICE FOR RECORDING VARIABLE PHYSICAL QUANTITIES
Luciano Moretto, San Donato, Milanese, Italy, assignor to AGIP S.p.A., Rome, Italy, a company of Italy
Continuation-in-part of application Ser. No. 371,538, June 1, 1964. This application Aug. 17, 1966, Ser. No. 572,963
Claims priority, application Italy, June 17, 1963, 698,011
6 Claims. (Cl. 73—152)

ABSTRACT OF THE DISCLOSURE

For recording temperatures in the bore of an oil well at different depths a probe is used in which are mounted, tube to produce an electron beam. The other two thermistor is connected to one section of an electronic indicator tube to produce an electron beam. The other two thermistors are connected to the other section of the tube to reflect the differential of the measurements of these two other thermistors and produce a corresponding electron beam. The two beams are recorded on film. To indicate the heights at which the measurements are made the probe carries means energized when it passes the joints of the tubing column, for producing an electric signal which produces a light beam recorded on the film.

---

The present invention relates to apparatus for recording on photosensitive film variable quantities of electrical, mechanical or thermal character. More particularly this invention relates to apparatus for indicating, for example, variations in temperature at different depths in the bore of an oil well or the like. This application is a continuation-in-part of my copending application, Ser. No. 371,538, filed June 1, 1964, now abandoned.

There are optical, as well as mechanical, recorders known for indicating variations in, for instance, temperature conditions. The characteristics of these recorders are such, however, as to render their use impractical in measuring temperatures in the bore of an oil well.

Devices are also known which are capable of providing optical indications of physical quantities, such as the devices disclosed, for instance, in the U.S. Patent No. 2,429,466.

In the particular field of research as to ore deposits, physical quantities have been recorded by means of vibrating strings through apparatus such as is disclosed in U.S. Patent No. 2,750,796, or with circuits oscillating at variable frequencies, such as in the case of the apparatus of U.S. Patent No. 2,637,998.

Among the disadvantages of these known devices are their high cost, their high mechanical inertia, their excessive requirements as to space, their weights, and the high energy required to be delivered to the recording member to obtain a sufficient displacement of the indicator, proportional to the measurement to be made.

On object of the present invention is to provide apparatus, which is simple in construction yet will give safe readings without having any of the disadvantages mentioned above.

Another object of the invention is to provide an instrument of the character described which may be used where there exist problems of weight and space. To this end, a further object of the invention is to provide an instrument of the character described which is relatively very light and requires little space, and can be made in any cross sectional geometrical shape.

Another object of the invention is to provide apparatus of the character described which will permit recording very small variations in the quantities to be measured, with increased accuracy.

Another object of the invention is to provide apparatus for the purpose described which can be operated by low electrical energy.

Another object of the invention is to provide a recorder which can be used where the instrument is subject during operation to shock or vibration.

Another object of the invention is to provide an instrument of the character described which can be used where it is desired to record high speed phenomena.

Other important objects of the invention are to provide apparatus for the purpose described which consists primarily of electronic elements, thereby rendering the apparatus light in weight, insuring more accurate records, since the apparatus is not influenced to any great degree by mechanical inertia, and at the same time, enabling the records to be made in a shorter time.

Another object of the invention is to provide a device of the character described which makes it possible to co-relate to the depth of a well bore and to record variations in temperature in function of time by marking on the recording medium the joints of the tubing column.

Another object of the invention is to provide apparatus which will operate to mark on photographic film the depth at which a measurement is made.

Other objects of the invention will be apparent hereinafter from the specification and from the recital of the appended claims, particularly when read in conjunction with the accompanying drawings.

One embodiment of the invention is illustrated in the accompanying drawing in which:

FIG. 4 is a schematic view illustrating how the apparatus is used;

FIG. 5 is a diagrammatic view illustrating the electronic amplifying and rectifying units of the apparatus.

The device illustrated, which is for testing and recording the temperature of the bore of an oil well at different depths, comprises a probe, which is adapted to be lowered into the bore. Mounted in this probe are three thermistors, spaced from one another axially of the probe, that is, axially of the bore. The middle thermistor is connected through an electronic amplifying and rectifying system to one section of a double-section "magic eye," or electronic indicator tube, to produce an electron beam. The other two thermistors are connected through an electronic amplifying and rectifying system to the other section of the "magic eye" or electronic indicator to produce an electron beam. The electron beams pass through slits in the housing of the "magic eye," and are recorded on photographic films moving past the "magic eye." Lenses and diaphragms placed between the "magic eye" and the film concentrate the electron beams. The lower parts of the beams are screened so that the images of only the upper parts of the beams will appear on the film. The height of the pencil of light passing through the slits will vary in correspondence with the signals produced by the two thermistor systems, and consequently there will be recorded on the film light lines whose heights will correspondingly vary. Calibrators permit adjusting the zero points of the two thermistor-actuated systems. To determine the height at which the various measurements are made, there is mounted in the probe a light source and an optical system for directing a ray of light therefrom onto the film along one edge thereof. The light source may be controlled by a magnetic indicator consisting, for instance, of two pole shoes between which a coil is located. No current is induced under conditions of constant flux; but at the joints of the tubing column there will be a flux variation; and consequently an electric signal will be produced which feeds the light source and thus causes light spots to be recorded on the film, marking the locations of the joints.

Figure 1:
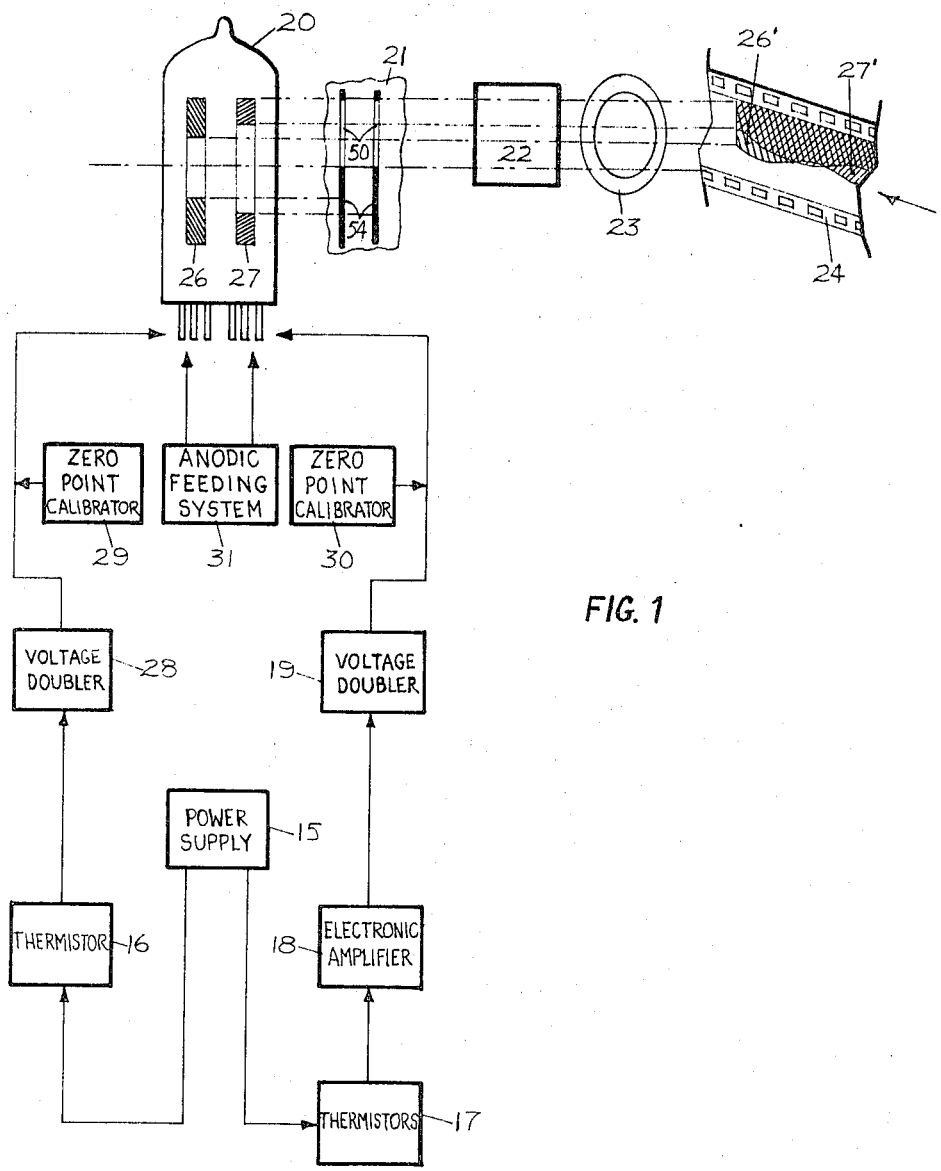
FIG. 1 is a diagram illustrating the construction and operation of apparatus built according to one embodiment of this invention.

Referring now to the drawings by numerals of reference, FIG. 1 shows diagrammatically one way in which the apparatus may be constructed. The block 15 represents diagrammatically the energizer or power supply for the apparatus as, for instance, a pair of dry cells capable of supplying a small voltage to sensitive elements represented by blocks 16 and 17. The element 16 is sensitive to the physical quantity to be measured, in the illustrated case, to the "absolute temperature." This element may consist of a resistance having a negative temperature coefficient, that is, may be a thermistor, for example, a Sieman's K–11 type thermistor. Block 17 designates two resistances having a negative temperature coefficient (thermistors), for example, Sieman's K–11 type thermistors. These together give the differential in temperatures between two axially spaced points of the bore, and are disposed, as mentioned above at opposite sides of the thermistor for reading the "absolute" temperature.

The signal coming from the sensitive member 17, which transforms the physical quantity to be measured into an electrical one, is sent to an electronic amplifier 18, for example, a RCA 7895 valve. Such a valve has a parabolic characteristic curve symmetric to the curve of the optical indicator 20, and serves to correct the non-linearity of the indicator.

Blocks 19 and 28 designate systems for amplifying and rectifying the signals to be measured, systems such as are known as "voltage doublers" each having diodes 45, 46, a resistor 47, and a capacitor 48 arranged as shown, for instance, in FIG. 5. The diodes may, for instance, be Philips No. 0A202 diodes; the resistor 47 may be a 1 MΩ resistor; and the capacitor may have a 1 μf. capacity.

After further amplification and rectification at 19 of the signal coming from the thermistor 16 which measures the "absolute temperature," the signal is sent to the "magic eye" 20. This device, which is of known construction and of the two electron beam type, such as shown in the Lieb U.S. Patent No. 3,161,800, for instance, converts the signal into a light signal which, after having been diaphragmed, that is, produced in known manner in strip form by means of the screen 21, and focussed at 22, is again diaphragmed at 23 to adjust the quantity of light, and finally is recorded on the photographic film 24. Screen 21 may consist of slits 50 in the housing 54 that surrounds the tube 20.

Block 29 designates the zero point calibration system for the part 16. This system comprises a single zero resetting chopper branched in the grid of that portion 26 of the indicator 20 which records said "absolute temperature." This calibration allows free variation of the grid signal and adjustment of the coincidence of the reference axis of the "absolute temperatures" with one side of the film.

Block 30 designates a zero point calibration system for the part 17 which records the temperature differential. It consists of a Wheatstone bridge (not shown) comprising two elements sensitive to the temperatures at the two spaced points 38 and 39 of temperature readings (points of FIG. 4), a fixed resistor, and a variable resistor. By adjusting the variable resistor so that there is an out-of-balance when the two temperatures at 38 and 39, and, therefore, the resistances in the two thermistors, have the same value, the differential temperature recording section 27 of the optical indicator produces a light mark whose upper end is in the middle point of slit 50 (FIG. 1), that cooperates therewith, and consequently on the film axis. In this way, the film axis, or longitudinal centerline of the film, represents the reference axis, and it is possible to record temperature variations both positive and negative.

Block 31 designates the anodic feeding system for the optical indicator. This anodic feeding system may be realized by transforming the low constant voltage of the dry cells into a high pulsating voltage by means of a known transistor network comprising, for instance, feedback transistors and a transformer. In such way the apparatus may be fed by the low energy of the dry cells.

The two-track "magic eye" 20 may be, for example, a Telefunken EMM 801 type valve. This magic eye works like the one described in the U.S. Patent of Lieb No. 3,161,800; but the patterns obtained on the film are not like those illustrated in FIGS. 2 and 5 and in FIGS. 7 to 9 of this patent, since, the lower part of the magic eye is screened in the present case by screen 21; and only the upper parts of the patterns will appear on the film 24.

To variations in the incoming signals, there will therefore correspond variations in the heights of the pencils of light passing through the slits 50 in screen 21 which in this case may be the housing or case for valve 20. Consequently there will be recorded on the film light lines of corresponding height. Since the inlet signals vary continuously, the heights of the pencils of light will vary continuously correspondingly, and in this way there will be recorded on a moving photographic film 24 areas whose profiles will indicate, as to the reference axis, the temperature values at different points in the depth of the well bore. Here there are visible the recording of a variable area relative to the traces 26', 27' coming from sections 26, 27 of the "magic eye."

The variation of the area of the trace 26' is due to the variation in the electric signal coming from the thermistor element 16, which is amplified electronically and rectified at 28 and sent to the section 26 of "magic eye" 20. The variation of the area of the trace 27' is due to the variation in the electric signals coming from the two thermistors denoted by block 17 which after amplification and rectification is sent to section 27 of the "magic eye."

The middle thermistor 16 may operate to record the absolute temperature values under predetermined standard conditions so as to give a predetermined voltage to the grid of one of the two tubes of the optical tuning indicator 20. When the absolute temperature changes, the grid resistance also changes, and with it the grid voltage, and therefore the anodic signal, which pilots the light emitted by the window of the optical indicator, changes correspondingly. The two outer thermistors 17 feed, respectively, the grid and the cathode of the other tube of the recording network; and the anodic signal of said tube, which is proportional to the difference of the measurements read by these two thermistors, pilots the grid of this other tube, producing through this a variable anodic signal which acts upon the light emitted from a second window of the optical indicator.

The need for carrying out temperature measurements in oil wells in production constitutes an example of one practical use for this invention. The probe adapted to carry the apparatus of this invention should be of quite small size, capable of operating even though subjected to intensive shocks and vibrations, be operative at temperatures of about 100° C., and consume extremely little energy since the instrument should be self-sufficient in operation.

Figure 2:
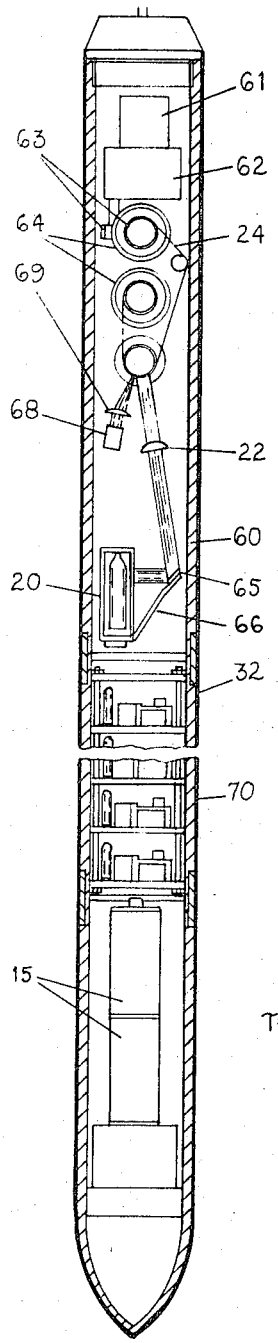
FIG. 2 is an axial sectional view through such apparatus.

One type of such probe is illustrated diagrammatically in FIG. 2. The whole instrument is enclosed within a cylinder 60 having an external diameter of fifty mm. and is capable of resisting an external pressure of four hundred atmospheres.

The instrument in use records continuously and simultaneously on film 25 mm. wide and at least 2 meters long both an obsolute temperature and a differential temperature, marking simultaneously on the film the joints of the tubing column. By this marking it is possible to correlate to depth the diagram recorded on the film as a function of time.

Referring to FIG. 2, 61 denotes a programming device which determines the beginning of operativeness of the apparatus of the invention. 62 is an electric motor energized by the dry cells and driving in conventional manner a gear reduction 63 for controlling the forward speed, and preferably connected also, with suitable devices of conventional character for assuring constant speed of traverse of the film 24 even in case of voltage drop. This driving mechanism drives the photographic film 24, the spools for which are indicated at 64. A focusing system is provided, whose objectives 22 allow photographic recording on the film 24 of the images of the recording element 20. These images emitting from slits 50 (FIG. 1) are reflected by a mirror 65 onto leans system 22. Mirror 65 is supported by a bracket 66 from the housing 21 of the "magic eye" 20. A source of light 68 mounted in the probe is useful for instance in fixing the positions at which the measurements are made. This operates through a lens or objective 69 to produce on the film, say along one edge thereof, marking points corresponding to the joints in the tubing of the well.

The assembly of programming device, motor, container for the film, focusing system, and recording element are in the top section of the probe. An intermediate section 70 contains the electronic system. This system may comprice the transistorized system 17, 18, 19, 16, 28, 31 (FIG. 1) with feedback transistors, and a transformer for transforming the low voltage of the dry cells into a high pulsating voltage for feeding the electronic tubes. The tubes amplify and rectify the signal coming from the elements 16, 17 (FIG. 1) which are sensitive to the quantities to be recorded. The recording network, with the scaled calibration systems 29, 30 may consist, as stated, of an electronic tube and an optical tuning indicator of the two combined valve type (single bulb). A magnetic indicator (not shown) may be provided in the probe for correlating the depth of the well with the recorded diagram of temperatures in function of time, by effecting marking, as indicated above, of the film in correspondence with the joints of the tubing column. This magnetic indicator may consist, for instance, of two pole shoes between which a coil is located and in which no current is induced under conditions of constant flux. At the joints 34 (FIG. 4) of the tubing column 33, however, there will be a flux variation. Consequently there will be generated in the coil an electric signal which is amplified and feeds the light source 68 (FIG. 2), which thus illuminates and records on the film light spots marking corresponding to the joints. These light spots on the right hand edge of the film indicate the presence of the joints, and therefore indicate the depths at which the measurements have been effected, since the distance between successive joints 34 is standard (usually, about nine meters).

The electronic system is fed and actuated by the third section 10 of the probe containing the elements for the supply feed, consisting, for example, of dry cells 15, and the sensitive elements 16, 17 which may comprise the three thermistors, the middle one of which is, as stated above, designed for measurement of the real temperature at the depth to be examined, and the other two of which are for measuring the temperature at two other points nearby as, for instance, at points fifty cm. from the middle thermistor.

Figure 3:
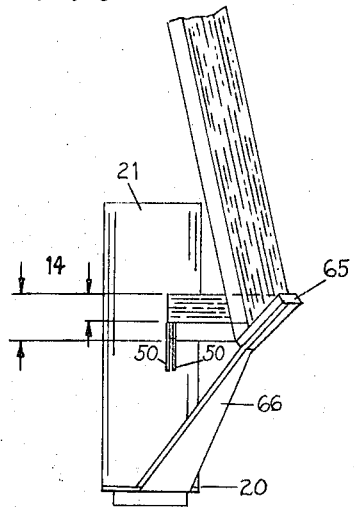
FIG. 3 is a diagrammatic view illustrating the operation of the "magic eye" indicator.

In FIG. 3 there is illustrated in particular the variable area recording element. Here 50 represents the slits in the housing of the optical indicator. The light variations reflected by the mirror 65 to go to the recording system.

The apparatus is illustrated in FIG. 4 as used in measuring the temperature at different depths in an oil well.

32 denotes the probe, which is lowered into the well by means of a cable 35 secured thereto, which runs over a pulley 36. The oil well is shown as lined by pipe sections 33, which together constitute the tubing column, and which are connected by joints 34. Mounted in the probe are the three thermistors, one of which may be located to read at the point 38 of the probe, another of which may be located to read at the point 39, and the third of which is located intermediate the two points 38 and 39, to read at the point 40.

Figure 6:
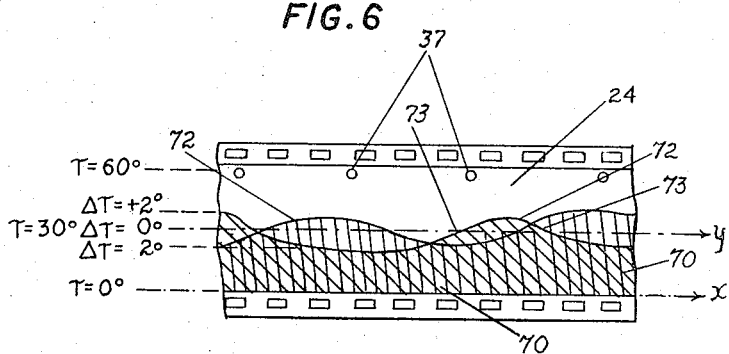
FIG. 6 is a fragmentary view on an enlarged scale of a strip of film on which a record has been made by apparatus of the present invention.

FIGURE 6 illustrates the type of recording obtainable in case of a measurement carried out in the bore of a well. Therein $\Delta T$ indicates the differential temperature between the points 38 and 39 of the probe, and T the values of the absolute temperature at the point 40. The points 37 represent the markings on film 24 indicative of the location of the tubing joints 34. These markings are produced by the source of light 68 (FIG. 2) piloted by the magnetic indicator which is sensitive to the magnetic field variations due to presence of the joints 34.

The operation of the device in measuring the temperatures in the bore of a well may be summarized as follows:

The thermistor 16 at point 40 (FIG. 4) transforms the value of the absolute temperature into an electric signal; and this signal, amplified by amplifier 28, is sent to the grid of one of the two triodes forming the "magic eye" 20. As the temperature in the well bore varies, the anodic current of the triode, and therefore the height of the pencil of light issued from a slit 50 of the "magic eye," and recorded on the film, will vary too. By manipulation of part 29, it is possible to adjust the reference axis, that is, the longitudinal axis on the film to coincide with one side of the film so that the absolute temperature course is given by the profile of the light track with reference to said axis, as shown in FIG. 6.

The signals of the uppermost and lowermost thermistors 17 at points 38 and 39 (FIG. 4) are, on the contrary, sent, respectively, to the grid and the cathode of the electronic valve 18, whose anodic signal, which is proportional to the difference of the two mentioned signals, and therefore to the difference of the temperatures at points 38 and 39, after having been amplified by amplifier 19, powers the grid of the second triode of the "magic eye" 20. The anodic current of the latter, variable according to the temperature difference, as above stated, will modify the height of the pencil of light issued from the second slit 50 and recorded on the film.

By adjustment of part 30, the reference axis may be the film axis itself, that is, the longitudinal centerline of the film. The T value is then given by the distance of the light profile from this longitudinal axis.

Since the two pencils of light T (absolute) and $\Delta T$ superpose on each other, we have on the film a zone of intense luminosity 70 and two light tracks 72 and 73 representing the profiles, respectively, of T absolute and $\Delta T$. T absolute is measured as to the X axis, $\Delta T$ is measured as the Y axis.

While the invention has been described with reference to a specific embodiment thereof and the specific use therefor, it is to be understood that it is capable of further modification and use, and that this application is intended to cover any variations, uses or adaptations of the invention, following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A device for simultaneously recording physical variable quantities and the differences of physical quantities at two different depths in the bore of a well, comprising a probe having mounted therein elements which are sensitive to and will measure the quantities to be recorded, means for converting the measurements made into electric signals, electronic means for amplifying said signals and for generating a high pulsating feed voltage therefrom, dry cells for producing a low constant voltage for energizing said elements and said electronic means, means for detecting and converting said electric signals into corresponding light signals, means for recording on photographic film said light signals, and means for marking on said film the joints of the tubing column of the well and consequently the different depths at which the measurements are effected, said means for detecting and converting said electric signals into corresponding light signals comprising an optical tubing indicator capable of producing a plurality of electron beams.

2. A device according to claim 1, wherein the means for detecting and converting the electric signals into light signals, comprises an electronic tube with two luminous traces proportional, respectively, to a physical quantity at one depth in the bore of the well and the differential between two physical quantities at two different depths in the bore of the well, one above and the other below the depth at which the first-named physical quantity is detected.

3. A device according to claim 2, wherein the electric control signal of said electronic tube, which is proportional to the differential of the two physical quantities, is supplied by the anodic signal of an electronic valve at the grid and at the cathode of which arrive the electric signals proportional to the values measured by two said elements positioned, respectively, at two different levels with respect to the depth of the well bore.

4. A device according to claim 2, wherein the light signal proportional to the first physical quantity has as its reference axis an edge of the photographic film, while the light signal proportional to the differential in the other two physical quantities has as its reference axis the median line of said film.

5. A device for recording and indicating differences in physical quantities at different depths in the bore of a well, comprising a probe having mounted therein a first element sensitive to the quantities to be recorded, a pair of elements also sensitive to the quantities to be recorded and disposed depthwise at opposite sides of the first element, means for converting the reactions of said first-named element into an electric signal, means for determining the differential between the reactions of said pair of elements, means for detecting and converting the differential into a second electric signal, separate means for detecting and converting said electric signals into corresponding light signals, electric power means for energizing all said means, and means for recording on photographic film said light signals, said means for detecting and converting said electric signals into light signals comprising an optical tuning indicator capable of producing a plurality of electron beams, one corresponding to each light signal.

6. A recording device as claimed in claim 4, wherein said recording means comprises photographic film and means for driving the same past said electron beams so that the images of the beams create superimposed areas on the film.

References Cited
UNITED STATES PATENTS

| | | | |
|---|---|---|---|
| 2,156,052 | 4/1939 | Cooper | 73—152 X |
| 2,382,609 | 8/1945 | Dale | 346—33 |
| 3,109,693 | 11/1963 | Clements et al. | 346—109 |
| 3,164,988 | 1/1965 | Cook | 73—154 |

RICHARD C. QUEISSER, *Primary Examiner.*

JAMES J. GILL, *Examiner.*

JERRY W. MYRACLE, *Assistant Examiner.*